Dec. 27, 1932.  F. W. VERNON  1,892,226
VALVE GEAR
Filed March 18, 1930    5 Sheets-Sheet 1
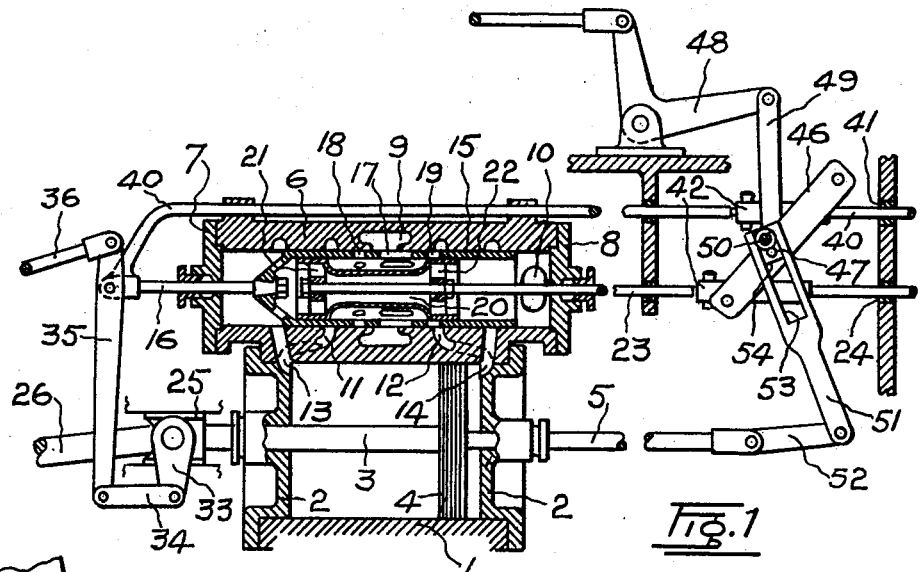
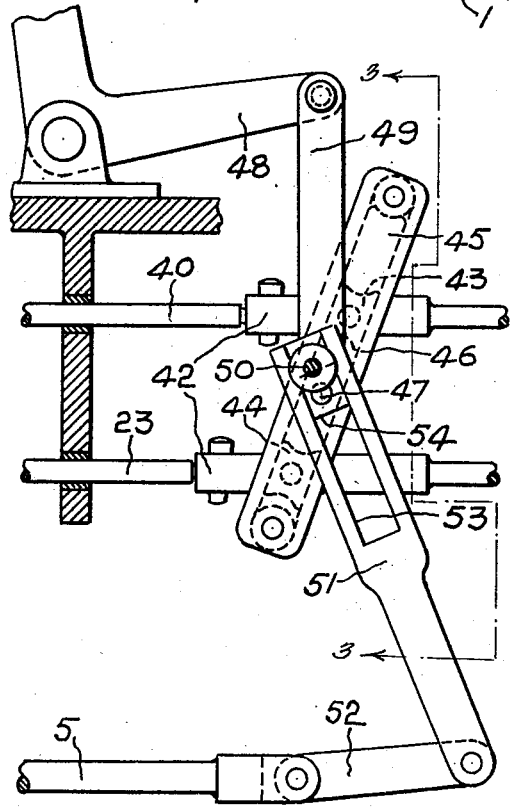
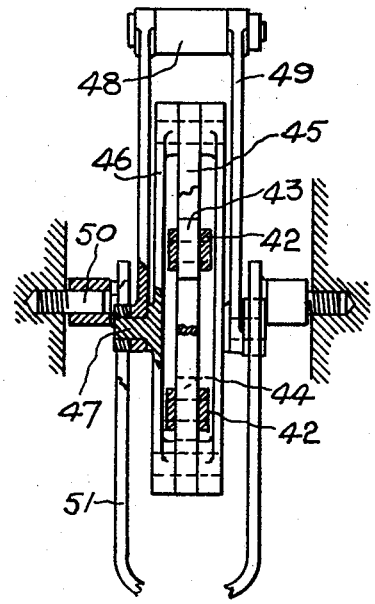
INVENTOR
FRANCIS W. VERNON
BY Fetherstonhaugh & Co
ATTORNEYS

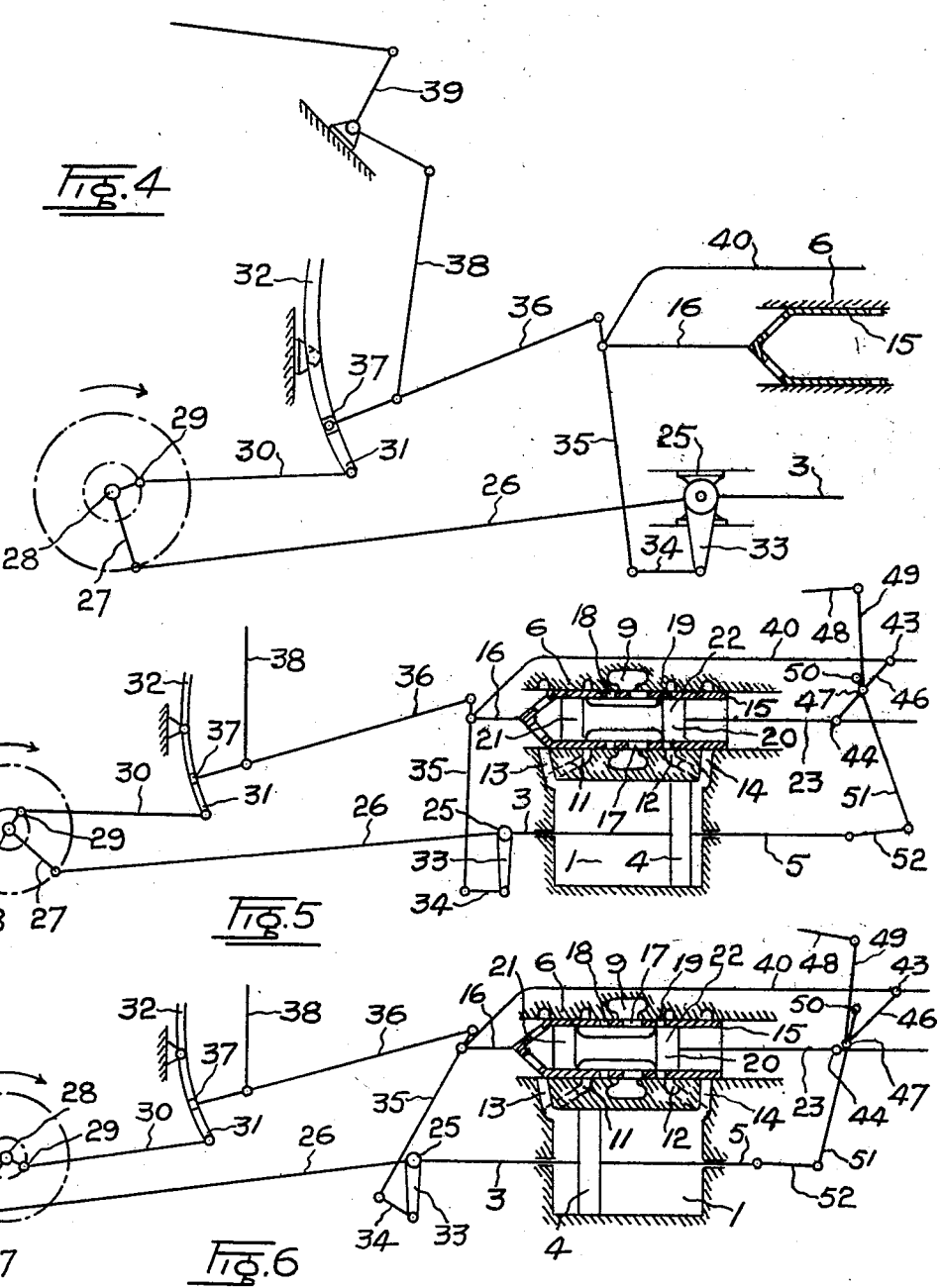

Dec. 27, 1932.  F. W. VERNON  1,892,226
VALVE GEAR
Filed March 18, 1930    5 Sheets-Sheet 4

INVENTOR
FRANCIS W. VERNON
BY Featherstonhaugh & Co
ATTORNEYS

Dec. 27, 1932.   F. W. VERNON   1,892,226
VALVE GEAR
Filed March 18, 1930    5 Sheets-Sheet 5

INVENTOR
FRANCIS W. VERNON
BY
Featherstonhaugh & Co
ATTORNEYS

Patented Dec. 27, 1932

1,892,226

UNITED STATES PATENT OFFICE

FRANCIS W. VERNON, OF VANCOUVER, BRITISH COLUMBIA, CANADA

VALVE GEAR

Application filed March 18, 1930. Serial No. 436,795.

My invention relates to improvements in valve gears which are particularly adapted for use in locomotives and other steam engines, which are subjected to largely fluctuating load conditions. The objects of the invention are to provide means under the direct control of the engineer whereby the steam cut off can be varied from an early to a late point of the piston stroke, to effect such changes without affecting the admission of steam, its compression and release, whereby full advantage can be taken of the present high pressures availing and extreme steam economy is attained. Also to provide means whereby valve velocity is increased, thus obviating the losses due to wire drawing of the steam in the early cut off, which is excessive and highly detrimental in the conventional valve arrangement, and to provide means whereby all the above objects are attained equally well at forward and reverse directions.

In the conventional type of valve mechanism the earlier the steam is cut off the greater is the compression, and if carried to extremes will produce violent pounding which can only be overcome by increasing the cylinder clearances which are a source of serious loss. By my system this disadvantage is entirely overcome.

The invention consists essentially of a steam engine having a piston type valve slidable within a ported sleeve, which piston is actuated through a variable link movement, as will be more fully described in the following specification and shown in the accompanying drawings.

Fig. 1 is a sectional view of the cylinder and valve movement.

Fig. 2 is a detail view of the valve actuating movement.

Fig. 3 is a cross sectional view partly fractionated taken on the line 3—3 of Figure 2.

Fig. 4 is a diagrammatic view of the crank and eccentric connections corresponding to the valve position as shown in Figure 1.

Fig. 5 is a diagrammatic view showing the valve gear adjusted to provide one degree of expansion.

Fig. 6 is a diagrammatic view showing the valve gear adjusted to provide another degree of expansion.

Figure 7:
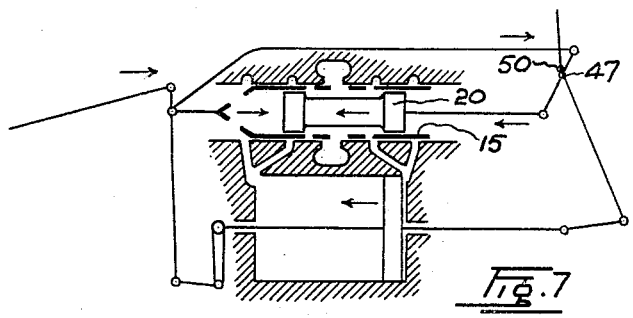
Figure 8:
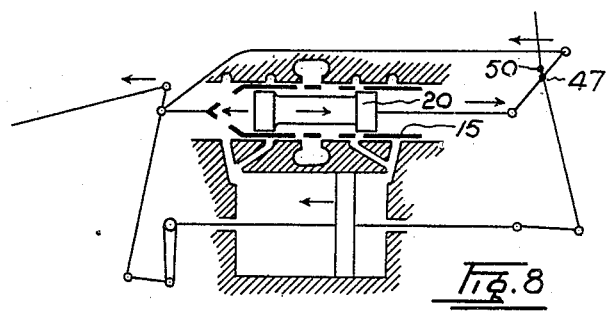
Figure 9:
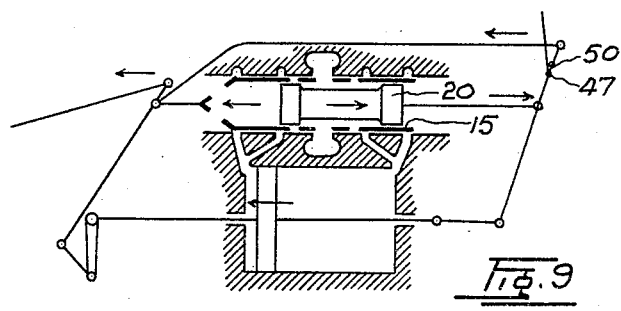
Figure 11:
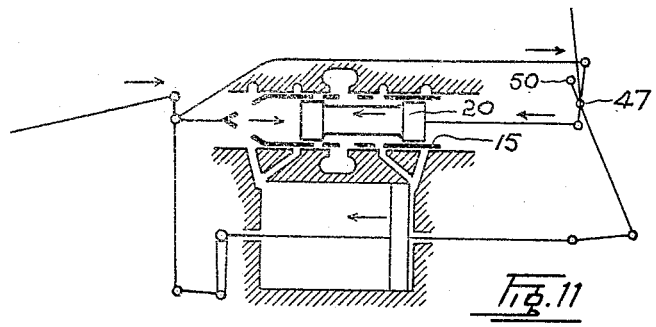
Figure 12:
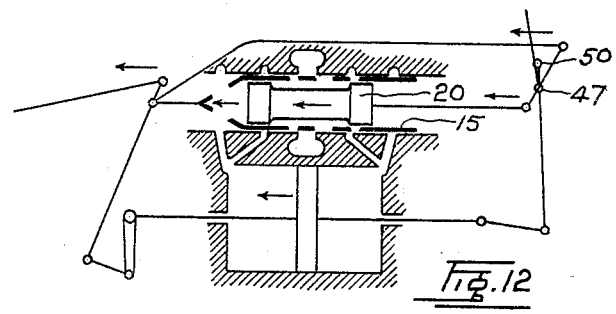
Figure 13:
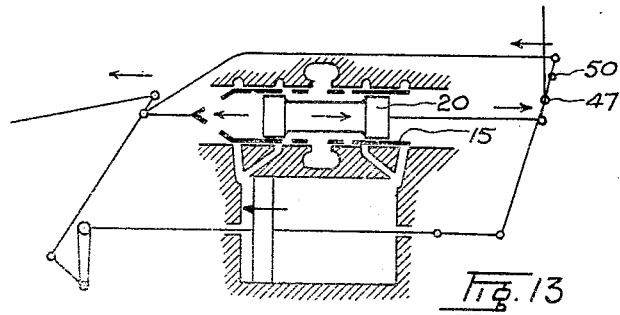
Figure 14:
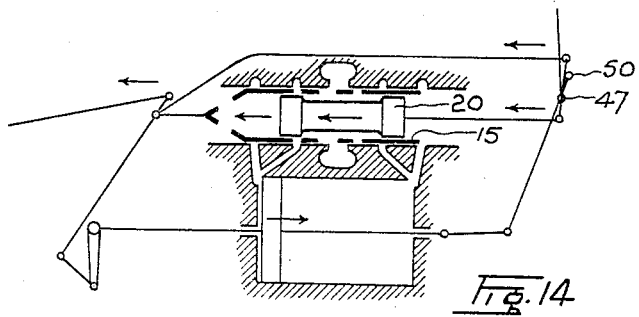

Figures 7, 8, 9 and 10 show the valve setting arranged to cut off steam entry to the working cylinder at a quarter stroke, Figure 7 showing relative position of piston valve and sleeve at point of admission of steam; Figure 8 relative positions at point of cut off; Figure 9 relative positions at commencement of cushioning, and Figure 10 relative positions at point of release. Figures 11, 12, 13 and 14 show the valve setting arranged to cut off steam entry to the working cylinder at half strokes, Figure 11 showing point of admission; Figure 12 showing point of cut off; Figure 13 showing commencement of cushioning, and Figure 14 showing point of release. Figures 15, 16, 17 and 18 are diagrams showing equivalent eccentrics or cranks as defined by the valve operating mechanism corresponding to various positions of cut off.

In the drawings like characters of reference indicate corresponding parts in each figure.

The numeral 1 indicates generally a steam cylinder having heads 2, a piston rod 3, a piston 4 and a tail rod 5. The cylinder is provided with a steam chest 6 having heads 7 and 8 and ported passages 9 for steam inlet from the boiler and 10 for steam exhaust pipe. Steam inlet ports 11 and 12 are provided from the steam chest to the front and rear ends respectively of the cylinder and exhaust steam ports 13 and 14 are provided respectively from the front and rear ends respectively of the cylinder to the steam chest 6. Slidably movable within the steam chest 6 is an open ended sleeve 15 having a connecting rod 16 extending outwards through the head 7 and having peripheral ports 17, 18 and 19 which are adapted to be brought into and out of register respectively with the ports 9, 11 and 12 to admit the steam to the cylinder 1.

Slidably movable within the sleeve 15 is an open ended hollow piston valve 20 having enlarged end portions 21 and 22 having steam tight engagement with the inner walls of the sleeve 15. This piston valve is fitted with a rod 23 which extends through a suitable gland in the head 8 and is supported at its outer end in a bearing 24. The piston rod 3 is fitted to the usual crosshead 25 which is attached to a connecting rod 26 fitted to the main crank 27 (see Figures 4, 5 and 6). Associated with a crank shaft 28 is an eccentric 29 (indicated by its centre in the diagrams) having an eccentric rod 30 pivotally attached at its outer end to a fork 31 extending downwards from a centrally fulcrumed reversing link 32. Extending from the crosshead 25 is a fixed arm 33 to the free end of which a link 34 is pivotally connected and from the free end of this link a substantially vertical combination lever 35 extends upwards, which is fulcrumed at the outer end of the sleeve rod 16 and is pivotally connected at its upper end with a radius rod 36 having connection with a crosshead 37 in the reversing link 32. The radius rod 36 is swingingly supported intermediate its length by a suspension rod 38 attached to a bell crank 39, which is actuated manually from a suitable reverse lever, not shown. Slidably mounted parallel to the sleeve rod 16 and connected thereto is a push rod 40 having a suitable bearing 41 at its outer end. Intermediate the length of the push rod 40 and the piston valve rod 23 are links 42 in which are pivotally mounted crosshead blocks respectively numbered 43 and 44, shown in dotted line in Figure 2. These crosshead blocks are held in a slide 45 shown in full line in Figure 3 and in dotted line in Figure 2, which is supported by opposed and spaced side plates 46 each having a trunnion 47 intermediate its length. The slide 45 passes through the links 42 which links in turn pass between the side plates 46.

A suitably mounted bell crank 48 which is adapted to be manually operated from any convenient position, supports pair of rocking arms 49 which are connected at their lower ends to the trunnions 47, so that the raising and lowering of the arms 49 will raise and lower the slide 45. Swingably mounted from fixed bearing points 50 is a fork 51 which is connected by a link 52 to the outer end of the piston tail rod 5, the upper extremities of the fork 51 are slotted to form slides 53 and are adapted to receive crosshead blocks 54 fitted to the outer end of the trunnions 47, so that when the rocking arms 49 are lowered the fulcrum of the slide 45 moves downwards between the slides 53 and the lateral movement of said fulcrum is increased due to its position below the fixed pivotal point 50. It will be noticed that since the push rod 40 is connected directly with the sleeve valve rod 16 that the crosshead block 43 will move at all times in concert with the sleeve. The block 43 thus drives the upper portion of the slide 45 which is fulcrumed on the trunnions 47 in any desired position of adjustment, by means of the bell crank 48, which may be immediately below the fixed centres 50 or at a distance therebelow. The fulcrum of the slide 45 being disposed within the length of fork 51 is obviously given a substantially horizontal movement in response to the movement of the tail rod 5. The consequent rocking movement of the slide 45 will impart a movement through the crosshead block 44 to the valve rod 23 and the piston valve 20. If the fulcrum 47 of the slide 45 is high or close to the fixed pivotal point 50 the piston valve will be virtually driven by an eccentric movement whose phase is well in advance of the main crank.

In my gear the fulcrum 47 of the link 45 is not fixed, but is given a horizontal movement whose magnitude can be varied at will, being greater as the fulcrum 47 of the arms 49 is lowered and thus taking a greater fraction of the piston's movement as given to the tail rod 5 since the fulcrum 47 is now at a greater distance below the fixed fulcrum 50 of the fork 51. At the same time the block 43 in the link 45 (see Figure 2) is still receiving the same movement in magnitude and phase as the sleeve 15 (see Figure 1). The link 45 is thus driven by two equivalent cranks or eccentrics one driving the block 43 and having the same phase and amplitude as the equivalent eccentric driving the main valve or sleeve 15 and the other having the same phase as the piston 4, but whose amplitude can be varied as desired by raising or lowering arms 49. The block 44 and hence the piston valve 20 thus receives a movement which is the result of the combined movements of fulcrum 47 and the block 43.

Figure 15:
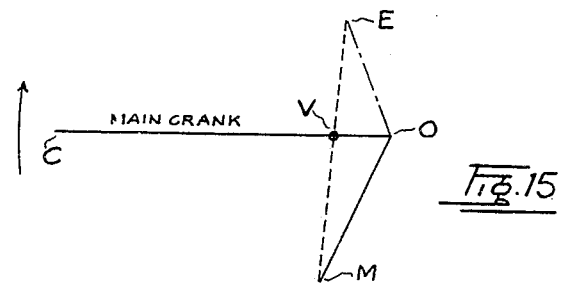
Figure 16:
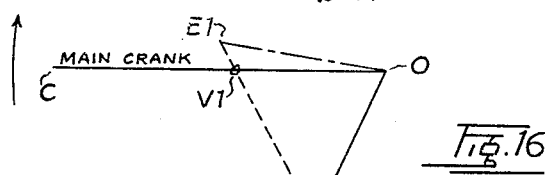
Figure 17:
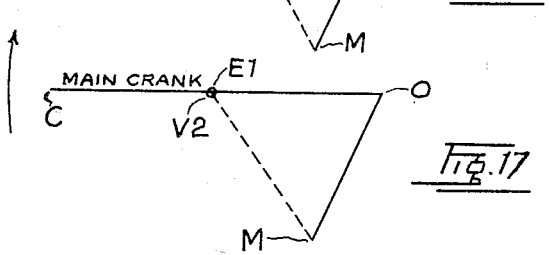
Figure 18:
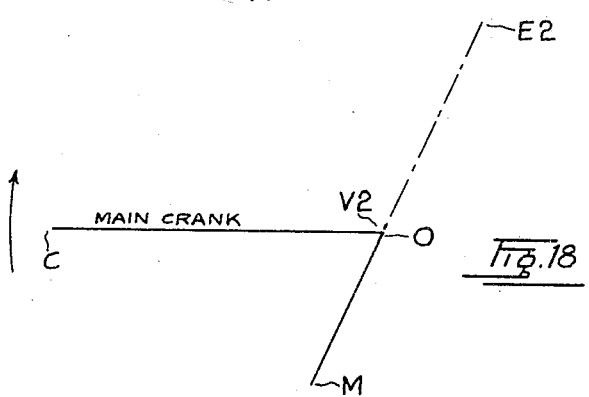

Figure 15 represents diagrammatically the equivalent eccentrics or cranks corresponding to an early cut off and the setting as shown in Figures 5, 7, 8, 9 and 10. Figure 16 represents the equivalent eccentrics or cranks corresponding to a late cut off and the setting as shown in Figures 6, 11, 12, 13 and 14.

O C in both Figures 15 and 16 represents the main crank 27 (Figures 4, 5 and 6).

O V represents the equivalent crank driving the fulcrum 47 in Figure 5.

O V1 represents the equivalent crank driving the fulcrum 47 in Figure 6. O V1 is obviously greater than O V.

O M represents the equivalent crank or eccentric driving the block 43 in both Figures 5 and 6, and is the same in both cases.

Now the ratio which is equal to distance from 44 to 43 divided by the distance from 47 to 43 (see Figure 5), is constant for all positions of the crank 27 as it rotates since the blocks 43, 44 and the fulcrum 47 all move horizontally. Hence the point E in Figure 15 may be found from the ratio E M divided by V M (Fig. 5) equals distance 44 to 43 divided by distance 47 to 43 (Fig. 5). This will give the point E.

O V is known. The value of O V is given by the relation O V (see Fig. 15) equals distance 50 to 47 divided by length of fork 51 times the radius of the main crank 27 (see Figure 5). Thus the valve 20 (Fig. 5) is virtually driven by an equivalent eccentric of radius O E (Fig. 15) which is in advance of the main eccentric O M by the angle E O M. Now the valve 20 (see Figure 5) only controls the cut off and the latter will occur earlier the greater the angle E O M. In order to make the cut off occur later the block 47 is lowered as shown in Figure 6. This lowering of the block increases the magnitude of the equivalent crank driving the floating fulcrum 47 from O V (see Figure 15) to O V1 (see Figure 16). Also the ratio of the distance 44 to 43 divided by distance 47 to 43 is altered, being less than before. Hence the equivalent crank or eccentric O E1 driving the valve 20 can be found as before from the relation E1M divided by V1M (see Figure 16) equals distance 44 to 43 divided by distance 47 to 43 (see Figure 6). Now the angle E1O M is less than the angle E O M (see Figure 15). Thus the virtual crank or eccentric O E1 driving the valve 20 (see Figure 6) leads the equivalent crank or eccentric O M driving the main valve 15 by a smaller angle than in the previous case, as given in Figure 5. Thus the valve 20 will cut off later if the setting is as shown in Figure 6 (and diagrammatically in Figure 16) than if the setting is as given in Figure 5. The arrangement thus virtually alters the angle of the equivalent eccentric from O E to O E1 and consequently the point of cut off can be varied at will. If the floating fulcrum 47 be lowered so far that its centre line coincides with the centre line of the block 44 then the whole of the movement given to the valve 20 is now wholly derived from and exactly in phase with the main crank 27. This is shown diagrammatically in Figure 17. If, however, the fulcrum 47 is raised so that its centre line coincides with the centre line of the trunnion bearing 50 then the whole of the movement given to the valve 20 is derived from, but 180 degrees out of phase with the main valve eccentric O M. This is shown diagrammatically in Figure 18.

Figure 10:
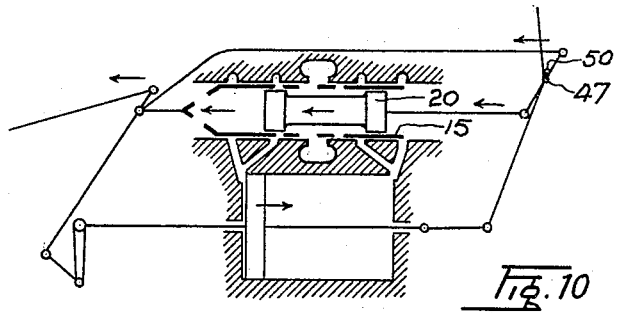

Assuming then that the fulcrum 47 is set slightly below the fixed fulcrum 50 as shown in Figures 5, 7, 8, 9 and 10, the sleeve valve 15 and the piston valve 20 will in passing through their movement to control one stroke of the piston 5 progressively assume the position shown in Figures 5, 7, 8, 9 and 10 respectively. In Figure 6 the exhaust port 13 is fully opened due to the rearward movement of the sleeve 15, which also opens the inlet port 12 to admit steam to drive the piston 4 in a forward direction, the result of this piston movement causes the piston valve 20 to travel forwardly towards a cut off point which does not take place until both the sleeve and piston valves reverse their motions as shown in Figure 8. Subsequent to the cut off, expansion drives the piston 4 to the point shown in Figure 9, where the sleeve valve movement in a forward direction closes the exhaust port 13 to provide a cushion to the piston stroke which is maintained until the piston is about to commence its return stroke as shown in Figure 10. When the fulcrum 47 is set a greater distance below the fixed fulcrum the cut off is effected later than before as is shown in Figure 12, the admission, cut off, cushion and release being shown in Figures 11, 12, 13, and 14 respectively.

What I claim as my invention is:

1. In a steam engine, a steam chest having steam inlet ports communicating with a working cylinder, which cylinder is provided with a working piston and piston rod, a sleeve valve having ports communicating with the steam inlet ports to the cylinder, a piston valve slidably mounted in the sleeve valve, a piston rod to said piston valve, a rod associated with the sleeve valve parallel to said valve piston rod, a rocking slide having a fulcrum, means pivotally connecting the slide on one side of the fulcrum with the rod associated with the sleeve valve and on the other side with the piston valve rod, and means for imparting movement to the fulcrum parallel to and between the piston valve rod and the sleeve valve rod in response to the movement of the working piston.

2. In a steam cylinder as claimed in claim 1 in which manual means is provided for varying the position of the fulcrum transversely to the piston valve rod.

3. In a steam engine, a steam chest having steam inlet and exhaust ports communicating with a working cylinder, which cylinder is provided with a working piston and piston rod, a sleeve valve having ports communicating with the steam inlet ports, a rod operatively connected with the sleeve valve and extending beyond the steam chest, a piston valve slidably mounted within the sleeve valve having a rod extending beyond the steam chest and parallel to the sleeve valve rod, a rocking link directly connected to each of said rods and a fulcrum for said link adjustable to a plurality of positions between said rods and means for moving said fulcrum parallel to said rods and in phase with the working piston.

Dated at Vancouver, B. C., this 5th day of February, 1930.

FRANCIS W. VERNON.